3,047,518
COMPOSITION COMPRISING A POLY(HALO-METHYL)DI-AROMATIC ETHER AND A PHENOL, METHOD OF FOAMING SAME, AND FOAMABLE PRODUCT OBTAINED THEREFROM

James D. Doedens, Midland, and Earl H. Rosenbrock, Auburn, Mich., assignors to The Dow Chemical Company, Midland, Mich., a corporation of Delaware
No Drawing. Filed Nov. 2, 1960, Ser. No. 66,696
10 Claims. (Cl. 260—2.5)

The present invention concerns improved solid plastic foams prepared from poly(halomethyl)di-aromatic ethers. More particularly, the invention involves incorporating a minor proportion of a phenolic material into a foamable poly(halomethyl)di-aromatic ether composition to improve or modify the strength, density and pore size characteristics of such foams.

It is taught in United States Letters Patent 2,911,380 that certain poly(halomethyl)di-aromatic ether compositions of the benzene series undergo condensation reactions under suitable thermal conditions and in the presence of a catalyst for the reaction to provide solid resinous foams. More specifically, the reference teaches that one or more chloromethylated or bromomethylated di-aromatic ethers are condensed in the presence of a small quantity of a Friedel-Crafts catalyst at a temperature within a range of from at least about 90° C. up to the decomposition temperature of the resulting resin to provide thermoset foamed bodies. Foams thus prepared, without other modification, are frequently characterized by an uneven pore structure of relatively large cells which may be disrupted with large blow holes. When such irregular large cells occur, the resulting solid foams exhibit low strength characteristics.

In our copending United States patent application Serial No. 842,608, filed September 28, 1959, now issued as United States Patent 3,000,839, there is disclosed an improved catalyst system for preparing the aforementioned foams. While the employment of the improved catalyst, i.e., ferrous or ferric phosphates, achieves a highly desirable and substantial improvement in the resulting solid foam as regards its pore size and shrinkage during curing, there still remains a large margin in these respects as well as in the area of strength characteristics for improvement.

It is a principal object of the present invention to provide novel foamable compositions containing poly(halomethyl)di-aromatic ethers. A further object is to provide solid foams prepared from such compositions which foams have improved structural and strength properties. A still further object of the invention is to provide a method for preparing such foams. Other objects and benefits will become manifest hereinafter as the invention is more fully described.

In accordance with the present invention, it has been discovered that foams prepared from poly(halomethyl) di-aromatic ether foamable compositions in accordance with the above-mentioned references have substantially improved structural and strength properties by incorporating into the foamable composition at least about 0.5 and up to about 20, preferably about 5 to about 10, percent by weight of the poly(halomethyl)di-aromatic ether composition of a phenolic material having at least one, but desirably 3, active aromatic ring positions. By "active aromatic ring position" on a phenolic material is meant a position either ortho or para to the hydroxyl substituent and occupied by a displaceable hydrogen atom.

Poly(halomethyl)di-aromatic ethers operable in the present invention have the general formula

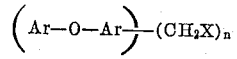

wherein Ar is an aromatic radical having at least one hydrogen atom subject to displacement by a halomethyl group in a halomethylation reaction, X is selected from the group consisting of chlorine and bromine and $n$ is an integer from 2 to 4, inclusive. The above formula is also to be understood as including unsymmetrical as well as symmetrical di-aromatic ethers. The average value of $n$ for a mixture of such poly-halomethyl di-aromatic ethers is termed the "halomethyl functionality" of the mixture.

Poly(halomethyl)di-aromatic ethers that can be employed in the present invention include di(chloromethyl)-diphenyloxide, tri(chloromethyl)diphenyloxide, tetra-(chloromethyl)diphenyloxide, di(bromomethyl)diphenyloxide, tri(bromomethyl)diphenyloxide, tri(chloromethyl)-para-di(chlorophenyl)oxide, di(chloromethyl)-para-ditolyl ether and the like compounds as well as mixtures of two or more of such ethers.

The mono(chloromethyl)di-aromatic ethers such as, for example, mono(chloromethyl)diphenyloxide and mono(bromomethyl)diphenyloxide, while not being operable in the present invention when employed alone, can be effectively employed in mixtures with sufficient amounts of the higher halomethyl derivatives to maintain an average halomethyl functionality of at least about 1.5 halomethyl groups per aromatic molecule in the mixture.

The above poly(halomethyl)di-aromatic ether compounds are prepared by known halomethylation procedures. The usual halomethylation reaction provides, as the initial reaction product, a mixture of the various halomethyl di-aromatic ether derivatives that are possible. For example, in a typical chloromethylation reaction employing formaldehyde, hydrogen chloride and a Friedel-Crafts catalyst such as zinc chloride, aluminum chloride, ferric chloride or borontrifluoride, mixed reaction products are obtained, which, depending upon the extent to which the reaction is carried out and the type and amount of catalyst used, consist of such chloromethyl derivatives of the di-aromatic ether employed and the isomers thereof as set forth in the following Table 1. The weight percent of chlorine in the mixture is a convenient designation of a poly(halomethyl)di-aromatic ether composition containing several constituents.

TABLE 1
Poly(chloromethyl)di-aromatic Ether Composition

| Component | Mole Percent | | | |
|---|---|---|---|---|
|  | 17.6% Cl | 25.2% Cl | 23.6% Cl | 30.7% Cl |
| Diphenyl ether (DPO) | 17.3 | 0.0 | 0.0 | 0.0 |
| o-Monochloromethyl DPO | 5.3 | 0.25 | 0.5 | 0.0 |
| p-Monochloromethyl DPO | 42.9 | 2.35 | 4.7 | 0.04 |
| o,p'-Dichloromethyl DPO | 10.8 | 17.7 | 35.4 | 1.9 |
| p,p'-Dichloromethyl DPO | 20.6 | 69.5 | 37.7 | 8.6 |
| Trichloromethyl DPO | 2.3 | 10.5 | 21.1 | 89.0 |
| Tetrachloromethyl DPO | 0.5–1.0 | 0.5 | 0.5–1.0 |  |

Specific phenolic materials operable in the invention include the mono- and dihydroxy derivatives which may also be alkyl, halo or alkoxy substituted so long as there remains at least one active aromatic ring position as defined above. This class of materalis includes, for example, phenol, resorcinol, meta-cresol, 2,4-xylenol, 3,5-xylenol, tertiary-butylphenol, meta-chlorophenol and the like phenolic materials.

Either continuous or batch process techniques may be employed to prepare the modified poly(halomethyl)diaromatic ether foams of the invention. Any procedure employed would essentially involve mixing small quantities of a phenolic material and a suitable catalyst for the condensation reaction into a poly(halomethyl)diaromatic ether composition in a manner so as to achieve a homonogeneous reaction mixture. The foaming reaction is then initiated upon the application of heat to the above-prepared reaction mixture. Employing any convenient means, the heating may be carried out simultaneously with the mixing of the ingredients for the reaction or at a subsequent time within the shelf life of the reaction mixture. The shelf life of the mixtures may vary from a few hours to several days or weeks depending upon the amount of the phenolic material employed (higher amounts tend to decrease the shelf life), effectiveness of the catalyst employed and the storage temperature conditions.

The lowest effective temperature for initiating the foaming reaction varies somewhat according to the amount of the phenolic material and the particular catalyst employed. In all instances, however, temperatures of at least about 135° C. are capable of initiating the foaming reaction. For catalysts such as the more efficient ferric or ferrous phosphates, temperatures of at least about 90° C. are sufficient. Any temperature from the lowest temperature which is sufficient to initiate the reaction up to the decomposition temperature of the foamed resin products can be employed.

While the catalyst is not necessary for operability, i.e., heat alone at higher temperatures is sufficient, it is preferred to employ one in order to promote the foam-forming reaction rate. For this purpose, Friedel-Crafts catalysts, even when employed in very small proportions and/or in a form deactivated by contact with water or with aqueous solutions of acids, bases or salts, are highly effective in catalyzing the condensation reaction and in causing a lowering of the temperature at which they can be achieved. Friedel-Crafts catalysts, such as those previously mentioned in connection with the preparation of the poly(halomethyl)di-aromatic ethers, are operable, but the catalyst set forth in our copending application mentioned above, vis., ferric and ferrous phosphates, are preferred.

The following examples are illustrative of the present invention and are not be construed as limitations thereof.

EXAMPLE I

To 45 parts of a poly(chloromethyl)diphenyloxide composition, hereinafter designated CMDPO–17, containing about 17.3 percent diphenyloxide, 48.2 percent mono-(chloromethyl)diphenyloxide, 31.4 percent di(chloromethyl)diphenyloxide, 2.3 percent tri(chloromethyl)diphenyloxide and about 0.5 percent tetra(chloromethyl)diphenyloxide, was added 5 parts of phenol and 0.5 part ferrous phosphate as a catalyst. The mixture was thoroughly stirred to achieve a homogeneous composition. Fifty grams of the mixture were placed in a one quart metal container on a hot plate at 125° C. Within a few seconds, a cured foam had been formed. Portions of the foam sample thus prepared were subjected to tests to determine density and compressive strength. The compressive strength measurements were made by directly applying a gradually increasing force to a 1 inch square metal plate placed on the flat foam surface. The strength was determined at the yield point of the foam at which there occurred a definite rupture in the cellular material as indicated by a pronounced penetration of the metal plate into the foam. Each reported compressive strength value is an average of 6 determinations made in the foregoing manner. The results for this run are given in the following Table 2. Also shown for comparison purposes is a run made without any phenolic additive.

TABLE 2

| Run | CMDPO-17 (Parts) | Additive (Parts) | $Fe_3(PO_4)_2$ (Parts) | Thermoset Foam Density (lb./ft.³) | Characteristics Compressive Str. (lb./in.²) |
|---|---|---|---|---|---|
| 1 | 45 | a 5 | 0.5 | 0.320 | 3.6 |
| 2 b | 50 | | 0.5 | 1.185 | 3.5 | a Phenol.
b Control.

EXAMPLE 2

Additional foamable compositions were prepared from the poly(halomethyl)di-aromatic ether composition of Example 1, a catalyst material and varying proportions of different phenolic additives.

The procedure employed was similar to that in Example 1 except that smaller quantities of the foamable composition were utilized for test samples. A homogeneous mixture of the reaction ingredients was prepared and a 5 gram sample of the mixture was placed in a flat-bottomed metal dish 2 inches in diameter with a ½ inch vertical side. The sample was placed on a hot plate at a controlled temperature and the time until the instant the foaming reaction started was observed and recorded. This period of time which is hereinafter termed "the reaction incubation time," is inversely proportional to indicia of the reaction rate. The foamed sample was then maintained on the hot plate until 30 seconds after completion of the foaming reaction as evidenced by the ceasing of the evolution of hydrogen chloride. All of the modified foams thus prepared exhibited improved strength properties similar to those obtained for the modified foam of Example 1.

The reaction incubation times and the character of the resulting foam are reported in the following Table 3 along with the composition and temperature variables for the particular run.

TABLE 3

| Run | CMDPO-17 (Parts) | Additive (Parts) | Catalyst (Parts) | Temp., °C. | Time¹ (Sec.) | Description of Product |
|---|---|---|---|---|---|---|
| 1 | 50 | | 0.5 $Fe_3(PO_4)_2$ | 100 | 60 | Thermoset foam. |
| 2 | 49.5 | 0.5 Phenol | 0.5 $Fe_3(PO_4)_2$ | 100 | 63 | Do. |
| 3 | 47 | 3 Phenol | 0.5 $Fe_3(PO_4)_2$ | 100 | 45 | Do. |
| 4 | 45 | 5 Phenol | 0.5 $Fe_3(PO_4)_2$ | 100 | 40 | Do. |
| 5 | 40 | 10 Phenol | 0.5 $Fe_3(PO_4)_2$ | 100 | 37 | Do. |
| 6 ⁴ | 37.5 | 12.5 Phenol | 0.5 $Fe_3(PO_4)_2$ | 100 | 65 | Thermoplastic foam. |
| 7 ⁴ ⁵ | 35 | 15 Phenol | 0.5 $Fe_3(PO_4)_2$ | 100 | 70 | Do. |
| 8 ⁴ | 32.5 | 17.5 Phenol | 0.5 $Fe_3(PO_4)_2$ | 100 | | No foam. |
| 9 ⁴ | 25 | 25 Phenol | 0.5 $Fe_3(PO_4)_2$ | 100 | | Do. |
| 10 | 45 | 5 Phenol | 1 $FeCl_3$² | 125 | 45 | Thermoset foam. |
| 11 | 45 | 5 Phenol | 1 $ZnCl_2$³ | 135 | 65 | Do. |
| 12 | 45 | 5 Tertiary-butylphenol | 0.5 $Fe_3(PO_4)_2$ | 125 | 80 | Do. |
| 13 | 45 | 5 2,4-Dichlorophenol | 0.5 $Fe_3(PO_4)_2$ | 125 | 37 | Do. |
| 14 | 45 | 5 4-Chlorophenol | 0.5 $Fe_3(PO_4)_2$ | 125 | 40 | Do. |

¹ Reaction incubation time.
² A 50 percent solution of $FeCl_3$ in methanol.
³ A 50 percent solution of $ZnCl_2$ in methanol.
⁴ Runs 6 through 9 were self-initiating, i.e., the reactions began at room temperature.
⁵ The foams shrank as they cured to a size less than 50 percent of the initial foam volume.

In a manner similar to that of the foregoing examples, other phenolic materials such as resorcinol, meta-cresol and xylenol may be substituted for the phenolic material employed above to achieve comparable results in improving the strength characteristics of the resulting foamed bodies. Likewise, other foamable compositions containing different poly(halomethyl)di-aromatic ethers such as di-, tri- and tetra(chloromethyl)diphenyloxide and mixtures such as those given in Table 1 containing 25.2, 23.6 and 30.7 percent combined chlorine can be substituted for the CMDPO-17 employed in the foregoing examples to achieve comparable modified foams.

What is claimed is:

1. A composition of matter comprising a major proportion of a poly(halomethyl)di-aromatic ether composition of the benzene series having an average halomethyl functionality of at least about 1.5 and up to 4 per aromatic molecule wherein the halogens are selected from the group consisting of chlorine and bromine, and a minor proportion of about 0.5 up to about 20 percent by weight of the halomethylated di-aromatic ether composition of a phenol selected from the group consisting of mono- and diphenols having at least one active aromatic ring position.

2. A composition of matter comprising a major proportion of a poly(halomethyl)di-aromatic ether composition of the benzene series having an average halomethyl functionality of at least about 1.5 and up to 4 per aromatic molecule wherein the halogens are selected from the group consisting of chlorine and bromine, a minor proportion of about 0.5 up to about 20 percent by weight of the halomethylated di-aromatic ether composition of a phenol selected from the class consisting of mono- and diphenols having at least one active aromatic ring position and a sufficient quantity of a Friedel-Crafts catalyst to promote curing of the composition into a solid foam.

3. A composition of matter as in claim 1 wherein the poly(halomethyl)di-aromatic ether composition is a chloromethylated diphenyloxide composition having an average chloromethyl functionality of at least about 1.5 and up to 4 per aromatic molecule.

4. A composition of matter as in claim 1 wherein the phenol employed is phenol.

5. A composition of matter comprising a major proportion of a poly(chloromethyl)diphenyloxide composition having an average chloromethyl functionality of at least about 1.5 and up to 4 per aromatic molecule, a minor proportion of about 0.5 up to about 20 percent by weight of the chloromethylated diphenyloxide composition of phenol and a sufficient quantity of a catalyst selected from the group consisting of ferrous and ferric phosphates to promote curing of the composition into a solid foam.

6. A process which comprises the steps of (A) mixing together a poly(halomethyl)di-aromatic ether composition of the benzene series having an average halomethyl functionality of at least about 1.5 and up to 4 per aromatic molecule wherein the halogens are selected from the group consisting of chlorine and bromine; a minor proportion of about 0.5 up to about 20 percent by weight of the halomethylated di-aromatic ether composition of a phenol selected from the class consisting of mono- and diphenols having at least one active aromatic ring position and a sufficient quantity of a Friedel-Crafts catalyst to promote curing of the composition into a solid foam; said mixing being adequate to provide a homogeneous reaction mixture and (B) heating the reaction mixture at a temperature from about 90° C. up to the decomposition temperature of the composition whereby a thermoset resinous foam is obtained.

7. A process as in claim 6 wherein the phenol employed is phenol.

8. A process as in claim 6 wherein the catalyst employed is selected from the group consisting of ferrous and ferric phosphates.

9. A solid, thermoset foam obtained by heating the composition of claim 1 at a temperature within the range from about 90° C. up to the decomposition temperature of the composition.

10. A solid, thermoset foam obtained by heating the composition of claim 2 at a temperature within the range from about 90° C. up to the decomposition temperature of the composition.

No references cited.